United States Patent Office 3,313,400
Patented Apr. 11, 1967

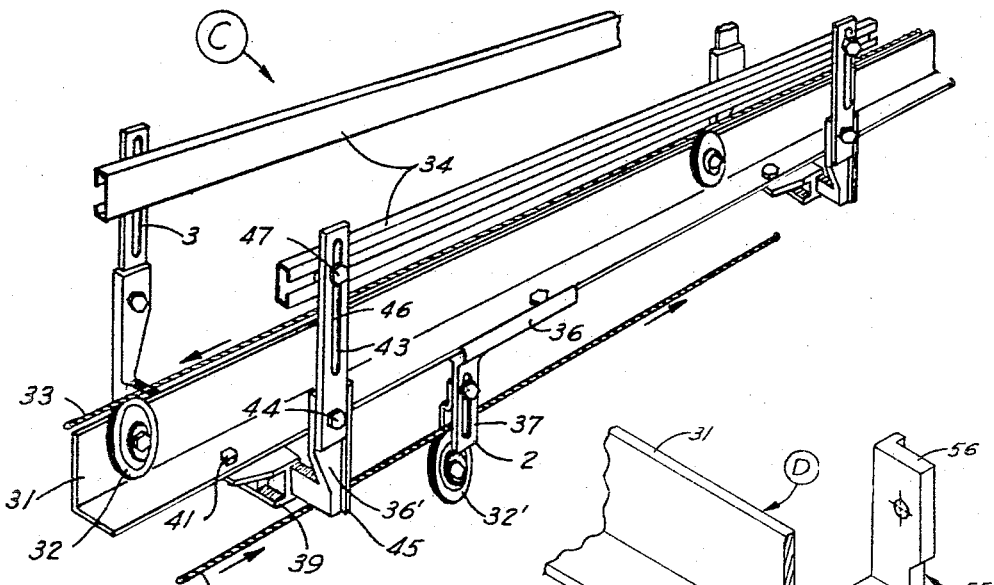
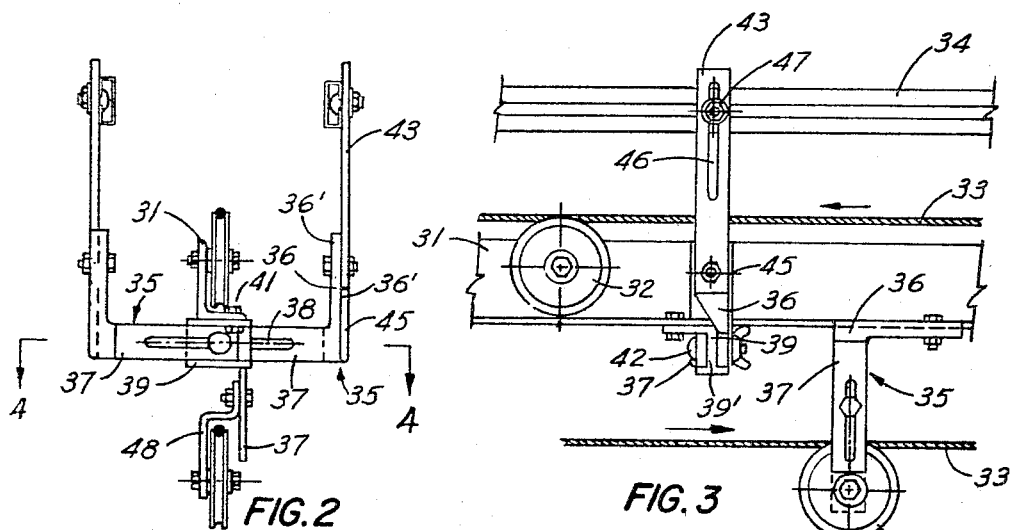
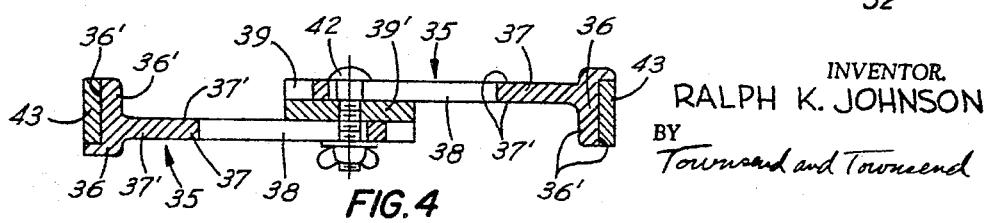
INVENTOR.
RALPH K. JOHNSON
BY
Townsend and Townsend

3,313,400
CAN CONVEYOR
Ralph K. Johnson, Palo Alto, Calif., assignor to Can-Veyor, Inc., Mountain View, Calif.
Filed May 6, 1965, Ser. No. 453,654
8 Claims. (Cl. 198—137)

The present invention relates in general to a can conveyor assembly for transporting cans of a variety of diameters and particularly to a can line conveyor including a plurality of identical brackets which are arranged in pairs for retaining cans within the confines of the conveyor and which can be easily adjusted to accommodate cans of different sizes.

In canneries and in can manufacturing plants cans are typically transported between the various operating stages in can conveyors which are assemblies having side rails for guiding the cans in a single line. Often the cans rest on a transporting member such as a moving cable or chain positioned in between the side rails. Since it is desirable to have each line conveyor able at different times to handle cans of different sizes, various schemes have been used for varying the width between the conveyor side rails.

One assembly constructed for adjustment of the spacing between side rails includes the provision of a plurality of spaced apart transverse brackets mounted along the line with each transverse bracket extending transversely below the line supporting beam and provided with adjustment slots adjacent each of its laterally extending ends for adjustably positioning an upright bracket on which the guide rails are mounted. Opposing side rails must be adjusted separately by the separate adjustment of each upright bracket to which the side rail is attached, and where both side rails must be moved such as when changing the spacing between side rails having a moving cable on the centerline therebetween, a considerable amount of time is required to make all the adjustments. Naturally, in order to permit the upright brackets to be extended outwardly on the transverse bracket for accommodating the largest diameter cans therebetween, the transverse bracket must project outwardly from the centerline a distance greater than the radius of the largest size can which the line is adapted to accommodate. Then these transverse brackets always extend outwardly from the centerline by this distance even when the upright brackets are moved inwardly to guide the smallest diameter can.

Another more readily adjustable conveyor assembly utilized in the past has included the provision of an adjustment rod rotatably mounted in a supporting bracket and provided with oppositely directed threads on the two ends thereof for simultaneously opening or closing spaced apart upright brackets threadably mounted thereon. By rotating the adjustment rod in one of two directions, the spacing between the upright brackets on which the side rails are mounted can be increased or decreased.

Among the difficulties with this screw adjustment rod construction has been the difficulty in maintaining the threads of the adjustment screw free and clean to permit each adjustment of the side members. This adjustment screw is positioned horizontally beneath the central portion of the conveyor assembly and collects dirt and any debris or waste spilled from the cans transported on the conveyor. This collection of dirt and debris clogs the threads of the adjustment screw so that the adjustment screw must be cleaned and lubricated periodically in order to maintain it operable.

Additionally, the adjustment rod construction requires a screw mounting bracket which is as wide as the largest transverse dimension of the conveyor assembly when accommodating the largest desired can size as well as additional space to permit movement of a crank or drive handle for turning the adjustment screw to vary the spacing between the side members. Also, this construction is quite expensive inasmuch as a large number of castings are required. Principally, two different types of side members are required since different threads are utilized at opposite sides of the conveyor as well as the bushings for rotatably mounting the screw member. Still further, while this structure permits simultaneous movement of side upright brackets with respect to a centerline therebetween, the structure does not permit independent movement of the brackets as is often desired for moving the line of cans off centerline for can control such as to other lines.

Broadly stated, the present invention to be described in greater detail below is directed to a can conveying assembly wherein the guide rails of the conveyor assembly are mounted on spaced apart pairs of identical L-shaped angle brackets having their side portions extending upwardly along the side of an elongate support member and their bases slotted and slidably held by a common fastening screw beneath the support member.

The conveyor assembly in accordance with the present invention utilizes identical angle brackets on opposite sides of the conveying assembly thereby reducing the cost of the assembly structure. Additionally, since the angle brackets are slidably mounted and fixed by a common adjustment screw, their spacing can quickly and easily be changed with only one adjustment. Furthermore, when the adjustment is being made the brackets can be positioned to the desired location separately so that the centerline between the angle brackets can be positioned to the side of the moving cable for can control where desired. Since the slotted face portion of the angle bracket which permits adjustment to wider and narrower cans lies beneath the support member, there are no protruding arms beyond the side rails of the conveyor and a minimum amount of space is taken up by the conveyor.

In the preferred embodiment of the present invention, the L-shaped side rail supporting bracket members have side and base portions defining the side and bases of the L with the side portions having broad faces arranged in vertical planes and the base portions provided with slotted broad faces arranged in vertical planes which are substantially normal to the vertical planes of the side portions. A portion of one slotted broad face of each of the base portions is aligned substantially coplanar with one apertured face of a bracket mounting member projecting downwardly beneath the support member so that the fastening screw for fastening the L-shaped brackets to the support member passes through the aperture in the bracket mounting member and the slot in each of the L-shaped mounting brackets. With the L-shaped mounting brackets constructed in this manner and by loosening only one fastening screw, each bracket of each pair of brackets can be adjustably positioned independently to the desired lateral position without producing moving contact with the other mounting member of that pair as would cause movement thereof. Also, this bracket construction provides a strong joint between the side and base portions of the L-shaped bracket with a minimum horizontal surface area on which dirt and debris can collect.

As still another aspect of the present invention where the can conveyor is of the cable conveying type in which a continuous cable is rotatably positioned on the support member between the side rails for moving the line of cans therebetween, the same L-shaped bracket members as are utilized to support the side rails can be mounted on the support member to project downwardly therefrom for mounting sheaves for supporting the return portion of the continuous cable.

As can be seen from the above the apparatus in accordance with the present invention provides ease in adjustment and adaptability of the can conveyor to various modes of operation with a minimum number of individual parts.

Other objects, features and advantages will become apparent upon a reading of the following specification and by referring to the accompanying drawing wherein the same characters of reference in the several views correspond to the same component or element.

In the drawings:

FIG. 1 is a perspective view of a portion of a cable can conveyor in accordance with the present invention;

FIG. 2 is an end view partially in section of the structure shown in FIG. 1;

FIG. 3 is a side view of the structure illustrated in FIG. 2;

FIG. 4 is an enlarged sectional view of a portion of the structure shown in FIG. 2 taken along line 4—4 in the direction of the arrows; and FIG. 5 is a perspective view of an alternative embodiment of the present invention.

While the present invention is generally applicable to can conveyors of the type wherein a line of cans is conveyed between a pair of guide rails either between or through can handling apparatus such as, for example, can filling machines in a cannery, the invention will be described specifically with reference to a can conveyor having a transporting member such as a moving cable on which the cans rest and are transported within the conveyor assembly. Naturally, this conveyor could be of other types such as, for example, a chain conveyor or could be a flat base member with the cans being moved therealong by gravity feed or some other feeding mechanism.

The can conveyor assembly C employing features of the present invention is illustrated in FIGS. 1–4 wherein the assembly C includes a support 31 on which are rotatably mounted sheaves 32 for support of transporting member or cable 33. Side members 34 are mounted above and to the side of the cable 33 by means of longitudinally spaced apart pairs of identical L-shaped brackets 35 secured to the support 31 in the manner described in greater detail below. Each of the L-shaped brackets 35 includes a side portion 36 having broad faces 36' positioned in substantially vertical planes and a base portion 37 provided with an elongate slot 38 extending between broad faces 37' which are also positioned in substantilaly vertical planes but which are arranged substantially normal to the vertical planes of the broad faces 36' of the side portion 36. The L-shaped brackets 35 are mounted on the support 31 via a bracket support member 39 secured to the support 31 via bolts 41 and having broad faces of a septum 39' arranged substantially vertical and parallel to the broad faces 37' of the base portions 37 and apertured for passage of a bolt assembly such as a thumb screw 42 a therethrough and through a portion of the slot 38 in each of the oppositely facing L-shaped brackets 35.

In the preferred embodiment of the present invention, upwardly projecting bracket extensions 43 are rigidly secured to the side portions 36 of each of the brackets 35 via a bolt 44 and a side portion, vertically extending, guiding edge 45 against which the bracket extension 43 is held. Each of these bracket extensions 43 are provided with an elongate slot 46 adjacent their upper end for adjustably securing the guide rails 34 thereto via bolts 47 at the desired vertical position above the cable 33.

The return portion 33' of the cable 33 is conveyed via sheaves 32' supported by L-shaped brackets 35 which have their side portions 36 secured such as by bolts to the support members 31 and to sheave supporting brackets 48 connected to base portions 37. Naturally, instead of the sheaves 32' being rotatably supported from brackets 48, they can be rotatably supported directly from the downwardly depending base portion 37 of the L-shaped bracket 35 secured to the bottom of the support member 31.

In order to adjust the conveyor assembly in accordance with the present invention, it is only necessary to loosen the thumb screw 42 and slidably position the individual L-shaped brackets 35 of each pair to the desired position. With the L-shaped brackets of each bracket pair provided on opposite sides of the septum 39' of the bracket support member 39, the brackets do not contact one another, and each of the brackets 35 of each pair can be moved individually without causing any movement of the other bracket of the pair. In this way the position of the guide rails 34 can easily be adjusted as either centered upon the cable 33 or off-set therefrom for can control as desired.

With the L-shaped brackets constructed as described in accordance with the present invention, a minimum number of parts are required since the same bracket 35 can be used for both sides of the conveyor assembly C as well as for support for the sheaves 32' holding the return cable 33'. Additionally, with the construction of the base and side portions 37 and 36 of brackets 35 in accordance with this invention not only is a strong joint provided between the base and side portions 37 and 36, but also a minimum horizontal surface area is provided for dirt and debris to collect which might impede the adjustment of the bracket members when adjusting the guide rails to handle different sized cans.

Referring now to FIG. 5 for an alternative embodiment of the present invention, there is illustrated just the support and bracket portion of a can conveyor assembly D similar to assembly C illustrated in FIGS. 1–4 but wherein the base portions 57 of the L-shaped members 55 have their broad surfaces arranged in a horizontal plane and slidably engage one another when they are secured to the support angle member via a screw 52. While this construction provides an advantage over the prior art in that no portion of the assembly D projects outwardly beyond the vertical side portions 56 of the brackets 55, there is a limited minimum spacing between the brackets 55 and there is a small difference in vertical height of the brackets 55 in each pair due to the positioning of the base portion 57 of one bracket 55 of the pair above the base portion 57 of the other bracket 55 when the pair is secured to the support member. Additionally, the horizontal broad faces of the bracket base portions 57 not only provide a weaker joint with the side portions 56 but also provide additional horizontal surface on which dirt and debris can collect to produce an unsanitary condition and impede the slidable operation of the L-shaped brackets 55.

Naturally, while the relative orientation of the side and base portions of the brackets in the assembly in accordance with the present invention has been described for an assembly positioned for movement of cans in a horizontal direction, the conveyor assembly will often be positioned for movement of cans in a direction at an angle to the horizontal. Therefore, the description hereinabove and in the claims of the planes in which the broad faces of the L bracket lie applies to the conveyor assembly translated into horizontal position if not already there.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a can conveyor of the type having a moving can transporting member, a support for said transporting member, spaced apart side rails supported from said support for containing cans on said transporting member, the improvement comprising a plurality of substantially identical L-shaped rail supporting bracket members, each of said bracket members having a side and a base portion defining the side and base of the L with said base portion provided with an elongate slot, said bracket members arranged in pairs spaced apart along the length of said support, the brackets of each pair positioned at opposite sides of said support with the bracket side portions extending upwardly spaced apart for supporting said side rails and containing a can therebetween and with the bracket base portions extending under said support in parallel planes, and screw means passing through a mating portion of the slots in each of the base portions of the brackets of each of said pairs for securing said pairs of brackets to said support.

2. In a can conveyor assembly in accordance with claim 1 characterized further in that said side and base portions include broad surfaces, the broad surfaces of said side members arranged in substantially vertical planes and the broad faces of said base portions arranged in substantially vertical planes positioned normal to the planes of said side portion surfaces thereby providing a strong joint between the side and base portions of said brackets and providing a minimum horizontal surface for the collection of dirt.

3. In a can conveyor in accordance with claim 1 a plurality of apertured bracket mounting members and means for securing said mounting members to the underneath side of said support with an apertured surface thereof projecting substantially vertically at spaced apart positions; said side and base portions of said bracket having broad faces, the broad faces of said side members positioned in substantially vertical planes and the broad faces of said base members positioned in substantially vertical planes normal to the vertical planes of said side members and parallel to the vertical apertured surfaces of said bracket mounting members, said screw means at each of said pairs passing first through the slot in one of said brackets, through the aperture in said bracket mounting member and then through the slot of the other bracket of said pair.

4. In a can conveyor of the type called for in claim 1 and wherein said transporting member is a continuous member, means for mounting a plurality of said L-shaped bracket members beneath said support at spaced apart positions, transporting member mounting means mounting the return portion of said transporting member on said spaced apart brackets mounted beneath said support.

5. In a can conveyor of the type called for in claim 1 a plurality of bracket extension arms, each of the side portions of said brackets being apertured and flanged for positioning one of said arms as an upward extension thereof, and means for securing one of said arms to each of said side portions.

6. A can conveyor comprising, in combination, an elongate can supporting member for supporting cans thereabove, a plurality of substantially identical L-shaped, rail supporting bracket members, each of said bracket members having a side and a base portion defining the side and base of the L with each of said base portions provided with an elongate slot therein, said bracket members arranged in pairs spaced apart along the length of said support with the brackets of each pair positioned at opposite sides of said support, the bracket side portions of each pair extending upwardly and spaced apart for containing a can therebetween, said bracket base portions extending under said support in parallel planes and screw means passing through a mating portion of the slot of each of the base portions of the brackets of each of said pairs for securing said pairs of brackets to said support.

7. A can conveyor comprising, in combination, an elongate can support member for supporting cans thereabove; a plurality of apertured bracket mounting members; means for securing said mounting members to the underside of said support member with the apertured surfaces thereof projecting substantially vertically downward at spaced apart positions along the length of said support member, a plurality of substantially identical L-shaped, rail supporting bracket members, each of said bracket members having a side and a base portion defining the side and base of the L, said bracket members arranged in pairs spaced apart along the length of said support, the brackets of each pair positioned at opposite sides of said support with the bracket side portions thereof extending upwardly spaced apart for containing a can therebetween and with the bracket base portions extending under said support, said side portions having broad faces arranged in vertical planes, said base portions provided with broad faces arranged in vertical plane substantially normal to the vertical planes of said side portions and provided with slots extending therethrough, one broad face of each of said base portions substantially coplanar with an apertured face of one of said bracket mounting members and with a portion of the slot of each base portion in registration with the aperture in said bracket mounting member and screw means passing through the slots in the bracket base portions of each pair of brackets and the aperture in the associated bracket mounting member for securing said pairs of brackets to said support.

8. An in line can conveyor comprising, in combination, a continuous moving can transporting member, an elongate can support member for supporting said transporting member; a plurality of apertured bracket mounting members; means for securing said mounting members to the underside of said support member with the apertured surfaces thereof projecting substantially vertically downward at spaced apart positions along the length of said support member, a plurality of substantially identical L-shaped, rail supporting bracket members, each of said bracket members having a side and a base portion defining the side and base of the L, said bracket members arranged in pairs spaced apart along the length of said support, the brackets of each pair positioned at opposite sides of said support with the bracket side portions thereof extending upwardly spaced apart for containing a can therebetween and with the bracket base portions extending under said support, said side portions having broad faces arranged in vertical planes, said base portions provided with broad faces arranged in vertical plane substantially normal to the vertical planes of said side portions and provided with slots extending therethrough, one broad face of each of said base portions substantiallly coplanar with an apertured face of one of said bracket mounting members and with a portion of the slot of each base portion in registration with the aperture in said bracket mounting member; screw means passing through the slots in the bracket base portions of each pair of brackets and the aperture in the associated bracket mounting member for securing said pairs of brackets to said support; at least one side rail extending above and along each side of said transporting member; means for mounting said side rails to the side portions of said bracket members; means for mounting a plurality of said L-shaped bracket members beneath said support member at spaced apart positions; and transporting member mounting means mounting the return portion of said transporting member on said spaced apart brackets beneath said support.

References Cited by the Examiner
UNITED STATES PATENTS 446,814  2/1891  Dodge _____ 198—204 X
559,371  5/1896  Dodge _____ 198—204 X EVON C. BLUNK, *Primary Examiner.*

A. C. HODGSON, *Assistant Examiner.*